United States Patent
Luna, Jr. et al.

(10) Patent No.: US 9,775,157 B2
(45) Date of Patent: **\*Sep. 26, 2017**

(54) ADAPTIVE TRANSMISSION ENERGY CONSUMPTION

(71) Applicant: Link Labs, Inc., Annapolis, MD (US)

(72) Inventors: Ricardo Luna, Jr., Las Cruces, NM (US); Adrian Sapio, Mount Airy, MD (US); Richard Kevin Sawyer, Jr., University Park, MD (US)

(73) Assignee: Link Labs, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/964,506

(22) Filed: Dec. 9, 2015

(65) Prior Publication Data

US 2016/0323886 A1 Nov. 3, 2016

Related U.S. Application Data

(63) Continuation of application No. 14/701,564, filed on May 1, 2015, now Pat. No. 9,253,727.

(51) Int. Cl.
*H04W 72/04* (2009.01)
*H04W 52/26* (2009.01)
(Continued)

(52) U.S. Cl.
CPC ....... *H04W 72/0473* (2013.01); *H04L 1/0009* (2013.01); *H04L 1/0015* (2013.01);
(Continued)

(58) Field of Classification Search
CPC ............. H04W 52/242; H04W 52/146; H04W 52/0261; H04W 52/0245; H04W 52/20;
(Continued)

(56) References Cited

U.S. PATENT DOCUMENTS

| 5,930,706 A * | 7/1999 | Raith ................... H04W 68/00 340/7.35 |
| 9,253,727 B1 * | 2/2016 | Luna, Jr. ............. H04W 52/265 |
| 2004/0170132 A1 * | 9/2004 | Shin ....................... H04W 52/10 370/294 |
| 2006/0268848 A1 * | 11/2006 | Larsson ............ H04L 29/06027 370/356 |

(Continued)

FOREIGN PATENT DOCUMENTS

KR WO 2014178678 A1 * 11/2014 ........ H04W 74/0816

*Primary Examiner* — Ian N Moore
*Assistant Examiner* — Justin T Van Roie
(74) *Attorney, Agent, or Firm* — Charles B. Lobsenz; Brian Buck; Potomac Law Group, PLLC

(57) ABSTRACT

A method, of operating an end node to wirelessly communicate with a central node, includes: receiving wirelessly a current instance of a beacon signal periodically-transmitted from the central node; measuring a received power, $P_{B-RX}$, of the beacon signal; reading locally-stored values of $P_{B-TX}$ and G representing a presumed transmitted power of the beacon signal and a performance goal of the end node, respectively; determining, for a given channel, a path loss, PL, based on the $P_{B-RX}$ and the $P_{B-TX}$; and adaptively setting an energy level, $E_{N-TX}$, of a forthcoming message to be transmitted from the end node by adaptively determining, based on PL and G, at least two of: a level of power, $P_{N-TX}$; a forward error correction coding rate, c; and a spreading factor, SF; and a modulation format, M.

28 Claims, 7 Drawing Sheets

(51) Int. Cl.
*H04W 52/20* (2009.01)
*H04L 1/00* (2006.01)
*H04W 52/02* (2009.01)
*H04W 52/24* (2009.01)
*H04W 52/14* (2009.01)
*H04W 24/08* (2009.01)

(52) U.S. Cl.
CPC ........... *H04L 1/0042* (2013.01); *H04W 24/08* (2013.01); *H04W 52/0245* (2013.01); *H04W 52/0261* (2013.01); *H04W 52/0277* (2013.01); *H04W 52/146* (2013.01); *H04W 52/20* (2013.01); *H04W 52/242* (2013.01); *H04W 52/265* (2013.01); *Y02B 60/50* (2013.01)

(58) Field of Classification Search
CPC ............ H04W 72/0473; H04W 52/265; H04L 1/0042
See application file for complete search history.

(56) References Cited

U.S. PATENT DOCUMENTS

| | | | |
|---|---|---|---|
| 2011/0039589 A1* | 2/2011 | Skov | H04W 52/146 455/501 |
| 2011/0099287 A1* | 4/2011 | Manor | H04W 28/22 709/233 |
| 2016/0066204 A1* | 3/2016 | Khawer | H04W 72/042 455/500 |
| 2016/0081010 A1* | 3/2016 | Seok | H04W 74/0816 370/329 |

* cited by examiner

ADAPTIVE TRANSMISSION ENERGY CONSUMPTION

CROSS-REFERENCE TO RELATED APPLICATION

This application is a continuation of U.S. patent application Ser. No. 14/701,564, filed on May 1, 2015 and issued as U.S. Pat. No. 9,253,727, which is hereby incorporated in its entirety by reference herein.

FIELD

Embodiments of the present invention relate to methods of operating an end node to wirelessly communicate (e.g., in an unlicensed spectrum) with a central node, and methods of operating a central node to communicate wirelessly (e.g., in the unlicensed spectrum) with instances of an end node, and more particularly to methods of operating such an end node to adaptively set an energy level of a forthcoming transmission therefrom based on (among other things) a path loss determined relative to a periodic beacon signal from the central node, and methods of operating a central node to periodically transmit the beacon signal and to periodically transmit a corresponding configuration signal.

BACKGROUND

Circa 2009, the Internet was in a stage of its evolution in which the backbone (routers and servers) was connected to fringe nodes formed primarily by personal computers. At that time, Kevin Ashton (among others) looked ahead to the next stage in the Internet's evolution, which he described as the Internet of Things ("IoT"). In his article, "That 'Internet of Things' Thing," *RFID Journal*, Jul. 22, 2009, he describes the circa-2009-Internet as almost wholly dependent upon human interaction, i.e., he asserts that nearly all of the data then available on the internet was generated by data-capture/data-creation chains of events each of which included human interaction, e.g., typing, pressing a record button, taking a digital picture, or scanning a bar code. In the evolution of the Internet, such dependence upon human interaction as a link in each chain of data-capture and/or data-generation is a bottleneck. To deal with the bottleneck, Ashton suggested adapting internet-connected computers by providing them with data-capture and/or data-generation capability, thereby eliminating human interaction from a substantial portion of the data-capture/data-creation chains of events.

In the context of the IoT, a thing can be a natural or man-made object to which is assigned a unique ID/address and which is configured with the ability to capture and/or create data and transfer that data over a network. Relative to the IoT, a thing can be, e.g., a person with a heart monitor implant, a farm animal with a biochip transponder, an automobile that has built-in sensors to alert the driver when tire pressure is low, field operation devices that assist fire-fighters in search and rescue, personal biometric monitors woven into clothing that interact with thermostat systems and lighting systems to control HVAC and illumination conditions in a room continuously and imperceptibly, a refrigerator that is "aware" of its suitably tagged contents that can both plan a variety of menus from the food actually present therein and warn users of stale or spoiled food, etc.

In the post-2009 evolution of the Internet towards the IoT, a segment that has experienced major growth is that of small, inexpensive, networked processing devices, distributed at all scales throughout everyday life. Of those, many are configured for everyday/commonplace purposes. For the IoT, the fringe nodes will be comprised substantially of such small devices.

Within the small-device segment, the sub-segment that has the greatest growth potential is embedded, low-power, wireless devices. Examples of low-power, low-bandwidth wireless networks include those compliant with the IEEE 802.15.4 standard (or the "Zigbee protocol"), the 6LoWPAN standard, the LoRaWAN standard (as standardized by the LoRa™ Alliance), etc. Such networks are described as comprising the Wireless Embedded Internet ("WET"), which is a subset of IoT.

It was assumed that Moore's law would advance computing and communication capabilities so rapidly that soon any embedded device could implement IP protocols, even the embedded, low-power, wireless devices of the WET. Alas, this has not proven true for cheap, low-power microcontrollers and low-power wireless radio technologies. The vast majority of simple embedded devices still make use of 8-bit and 16-bit microcontrollers with very limited memory because they are low-power, small and cheap.

Consequently, most of the WET includes resource-limited embedded devices, which typically are battery powered. The physical trade-offs of wireless technology have resulted in most of the WET using short-range, low-power wireless radios which have limited data rates (and consequently limited spreading factors), frame sizes and duty cycles.

Most wireless data networks must deal with the problem of an imperfect transmission channel. Because the transmission channel can vary with time, among some wireless networks, it is known to adaptively set one or the transmission settings, respectively.

For example, the LoRa modulation format does not itself describe system functionality above the physical layer, i.e., above the RF medium. At the physical layer, the LoRa modulation format permits the use of an adaptively varying spreading factor (which consequently affects the data rate). More particularly, the LoRaWAN standard permits the spreading factor to be set by the central node (with consequent adherence when the end nodes transmit). Moreover, the LoRaWAN standard's adaptively setting by the central node of the spreading factor is done slowly, on the order of once per day.

The LoRa™ modulation format can be described as a frequency modulated ("FM") chirp that is based on the generation of a stable chirp using a fractional-N ("fracN") phase-locked loop ("PLL"). Core LoRa™ technology is described in U.S. Pat. No. 7,791,415, which is assigned to Semtech™ Corporation.

SUMMARY

It is to be understood that both the following summary and the detailed description are exemplary and explanatory and are intended to provide further explanation of the present invention as claimed. Neither the summary nor the description that follows is intended to define or limit the scope of the present invention to the particular features mentioned in the summary or in the description. Rather, the scope of the present invention is defined by the appended claims.

In certain embodiments, the disclosed embodiments may include one or more of the features described herein.

An aspect of the present invention provides a method of operating an end node to wirelessly communicate with a central node. Such a method includes: receiving wirelessly a current instance of a beacon signal periodically-transmitted from the central node; measuring a received power, $P_{B-RX}$, of the beacon signal; reading locally-stored values of $P_{B-TX}$ and G representing a presumed transmitted power of the beacon signal and a performance goal of the end node, respectively; determining, for a given channel, a path loss, PL, based on the $P_{B-RX}$ and the $P_{B-TX}$; and adaptively setting an energy level, $E_{N-TX}$, of a forthcoming message to be transmitted from the end node by adaptively determining, based on PL and G, at least two of: a level of power, $P_{N-TX}$; a forward error correction coding rate, c; a spreading factor, SF; and a modulation format, M.

Another aspect of the present invention provides an end node configured to wirelessly communicate with a central node. Such an end node includes: a wireless unit configured to receive and transmit messages, respectively; a wireless interface configured to receive, via the wireless unit, a current instance of a beacon signal periodically-transmitted from the central node; a received-power sensor configured to measure a received power, $P_{B-RX}$, of the beacon signal; a memory, contents of which include: a value representing a presumed transmitted power, $P_{B-TX}$, of the beacon signal; and a value, G, representing a performance goal of the end node; a path-loss unit configured to determine, for a given channel, a path loss, PL, based on the $P_{B-RX}$ and the $P_{B-TX}$; and a transmit-energy unit configured to adaptively set an energy level $E_{N-TX}$ of a forthcoming message, to be transmitted via the wireless interface and wireless unit, by adaptively determining, based on PL and G, at least two of: a level of power, $P_{N-TX}$; a forward error correction coding rate, c; a spreading factor, SF; and a modulation format, M.

Yet another aspect of the present invention A method of operating a central node to wirelessly communicate with instances of an end node. Such a method includes: periodically generating a beacon signal; wherein the beacon signal changes over time; periodically transmitting, to the end nodes, the beacon signal; determining, if $i^{th}$ and $(i-1)^{th}$ instances of the beacon signal differ; measuring, if $B(i-1) \neq B(i)$, a transmitted power, $P_{B-TX}$, of the $i^{th}$ beacon signal B(i); periodically generating a configuration signal that includes: a value representing a transmitted power, $P_{B-TX}$, of B(i); and periodically transmitting, to the end nodes, the configuration signal.

Yet another aspect of the present invention provides a central node configured to wirelessly communicate with instances of an end node. Such a central node includes: a wireless unit configured to receive and transmit messages, respectively; a wireless interface configured to transmit, via the wireless unit, a beacon signal and a configuration signal, respectively; a beacon-signal generator configured to: periodically generate a beacon signal B; and periodically send, to the end nodes and via the wireless interface and the wireless unit, the beacon signal B; wherein the beacon signal changes over time; a transmitted-power sensor configured to: determine if $i^{th}$ and $(i-1)^{th}$ instances of the beacon signal B differ such that $B(i-1) \neq B(i)$; and measure, if $B(i-1) \neq B(i)$, a transmitted power, $P_{B-TX}$, of B(i); a configuration-signal generator configured to: periodically generate a configuration signal that includes a value representing a transmitted power, $P_{B-TX}$, of B(i); and periodically send, to the end nodes and via the wireless interface and the wireless unit, the configuration signal.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments of the present invention will be more particularly described in conjunction with the following drawings wherein.

DETAILED DESCRIPTION

Figure 1:
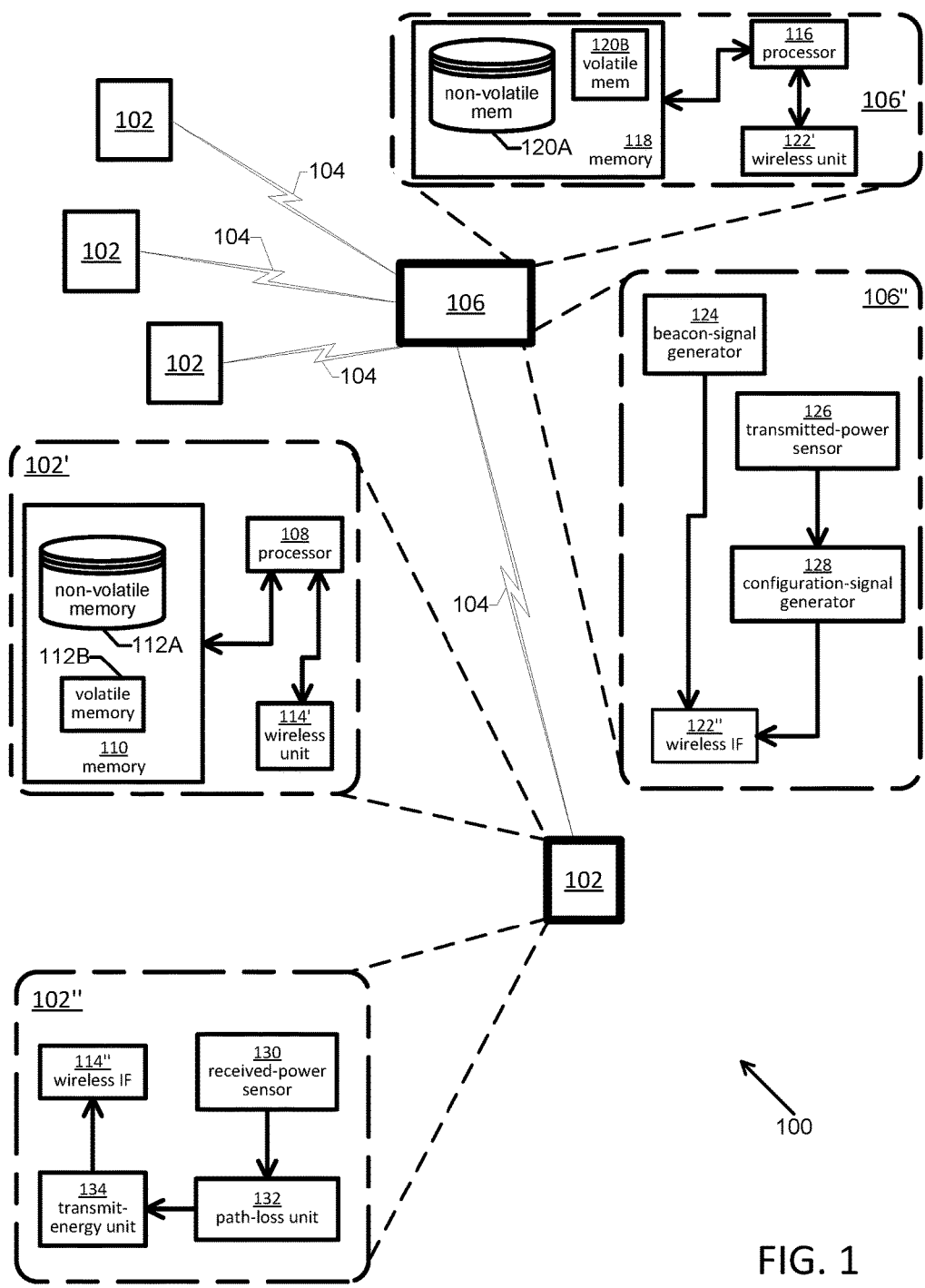
FIG. 1 is a block diagram of a wireless network, for example, a long-range, low-power network, according to an embodiment of the present invention, wherein FIG. 1 emphasizes physical unit and functional unit configurations.

Embodiments of the present invention will now be disclosed in terms of various exemplary embodiments. This specification discloses one or more embodiments that incorporate features of the present invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present invention. Thus, it is apparent that the present invention can be carried out in a variety of ways, and does not require any of the specific features described herein. Also, well-known functions or constructions are not described in detail since they would obscure the present invention with unnecessary detail.

The description is not to be taken in a limiting sense, but is made merely for the purpose of illustrating the general principles of the present invention, since the scope of the present invention is best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques. Examples of such wireless devices include cellular telephones, desktop computers, laptop computers, handheld computers, electronic games, portable digital assistants, MP3 players, DVD players, or the like.

FIG. 1 is a block diagram of wireless network 100, for example, a long-range, low-power network, according to an embodiment of the present invention, wherein FIG. 1 emphasizes physical unit and functional unit configurations.

In FIG. 1, wireless network 100 can be compatible with, e.g., the IEEE 802.15.4 standard, the LoRaWAN standard (as standardized by the LoRa™ Alliance), etc. For purposes of a more detailed discussion, at the physical layer, it will be assumed that wireless network 100 is compatible with the LoRa™ modulation format.

Network 100 includes: instances of end nodes 102; and a central node 106, e.g., a central gateway and/or a base station. Via wireless communication sessions 104, instances of end node 102 communicate with central node 106, respectively. As examples (and as will be discussed in more detail below, respectively), communications from central node 106 to instances of end node 102 can include a beacon signal and a configuration signal. Also as an example (and as will be discussed in more detail below), communications from an instance of end node 102 to central node 106 can include a data message. Accordingly, instances of end node 102 can be described as message-sourceable.

In terms of physical components (as illustrated by exploded view 102'), each instance of end node 102 includes: one or more instances of a processor 108; memory 110 which itself includes one or more instances of nonvolatile memory 112A and one or more instances of volatile memory 112B; and a wireless unit 114'. Also, in terms of physical components (as illustrated by exploded view 106'), each instance of central node 106 includes: one or more instances of a processor 116; memory 118 which itself includes one or more instances of non-volatile memory 120A and one or more instances of volatile memory 120B; and a wireless unit 122'.

Each of wireless unit 122' and wireless unit 114' is configured to receive and transmit messages wirelessly, respectively. Overall, the physical components of central node 106 and of each instance of end node 102, respectively, are operable to engage in (among other things), e.g., LoRaWAN compatible, frequency modulated ("FM") chirp communication that is based on the generation of a stable chirp using a fractional-N ("fracN") phase-locked loop ("PLL") (the PLL not being illustrated). For example, the wireless transmissions can be performed in an unlicensed spectrum.

In terms of functional units (as illustrated by exploded view 102''), each instance of end node 102 includes: a received-power sensor 130; a path-loss unit 132; a transmit-energy unit 134; and a wireless interface 114''. Also, in terms of functional units (as illustrated by exploded view 106''), central node 106 includes: a beacon-signal generator 124; a transmitted-power sensor 128; a configuration-signal generator 128; and a wireless interface 122''. For each of central node 106 and a given instance of end node 102, such functional units can be implemented at least in part, e.g., as executable code stored in one or more of the memories thereof (noted above), with such code being executable by one or more of the processors (noted above), respectively. Such implementations can conform to the communication-layer diagram of FIG. 2 (discussed below).

Figure 2:
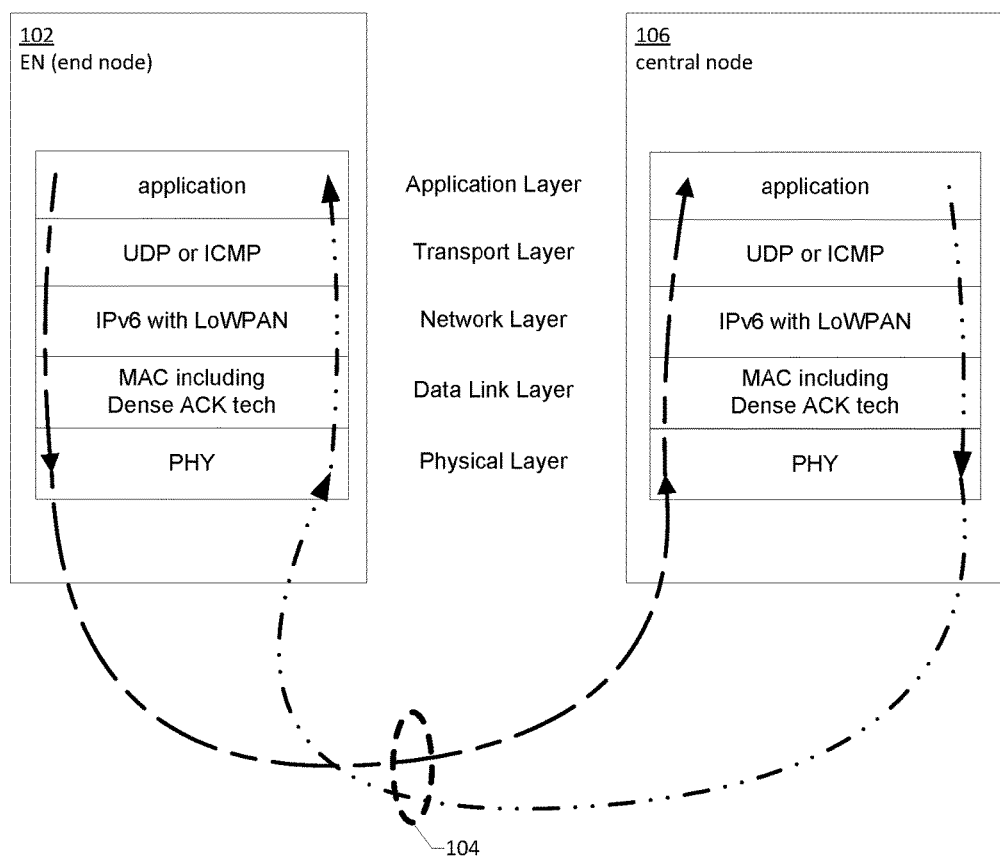
FIG. 2 is a communication-layer diagram illustrating the path of flow during an instance of a communication session between a central node and an instance of an end node, according to an embodiment of the present invention.

FIG. 2 is a communication-layer diagram illustrating the path of flow during an instance of communication session 104 between central node 106 and an instance of end node 102, according to an embodiment of the present invention.

Central node 106 and each instance of end node 102 can be implemented at least in part, e.g., as executable code stored in one or more of the noted (above) memories thereof and executed by one or more of the noted (above) processor units thereof, respectively. Such implementations can conform to the communication-layer diagram of FIG. 3.

More particularly, central node 106 and each instance of end node 102 can have a stack based (in part); on industry-standard layers. The layers illustrated in FIG. 2 represent but one example of combinations of layers that can be included in such stacks, respectively. Such layers, from bottom to top, for example (as illustrated in FIG. 2), can include: a physical layer; a data link (or MAC) layer that includes dense acknowledgement messaging-technology (see discussion below); a network layer (e.g., an IP with LoWPAN) layer; a transport layer (e.g., a UDP layer or ICMP layer); and an application layer. Alternatively, different combinations of layers could be used in the stack.

Figure 3:
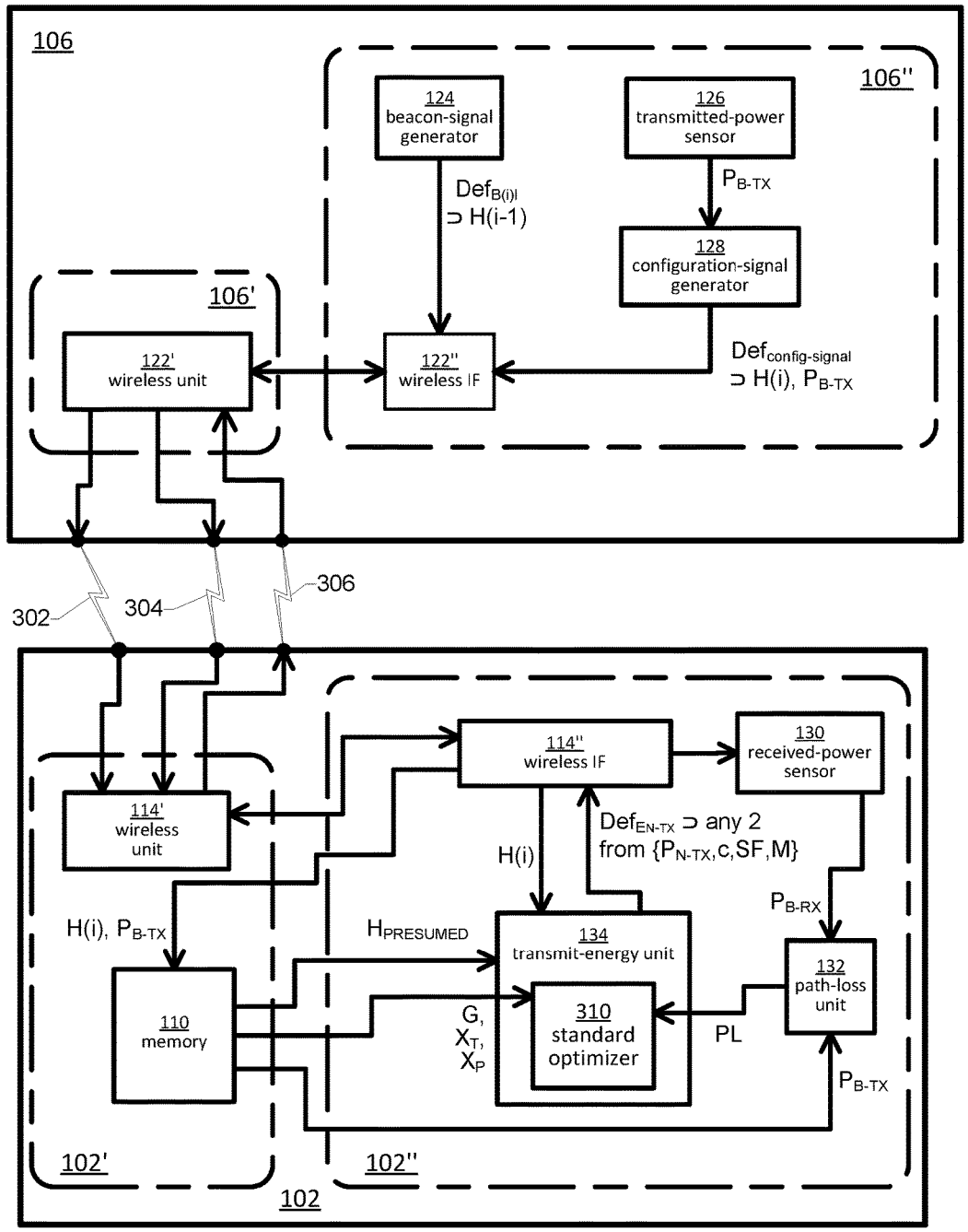
FIG. 3 is a block diagram illustrating a version of the wireless network of FIG. 1, according to an embodiment of the present invention, wherein FIG. 3 emphasizes signal flow.

FIG. 3 is a block diagram illustrating a version 300 of wireless network 100 of FIG. 1, according to an embodiment of the present invention, wherein FIG. 3 emphasizes signal flow. FIG. 3 will be discussed in the context of FIGS. 4A-4B and 5-6.

In FIG. 3, among other things, a standard optimizer 310 (discussed in more detail below) is illustrated as being included in transmit-energy unit 134; and instances 302, 304 and 306 of communication session 104 are illustrated. Briefly, central node 106 is configured, among other things, to: periodically generate and transmit a beacon signal B, which is illustrated in FIG. 3 as instance 302 of communication session 104; and periodically generate and send a configuration signal, which is illustrated in FIG. 3 as instance 304 of communication session 104. End node 102 is configured, among other things, to generate (as needed and/or as scheduled) a message to central node 106, the message being illustrated in FIG. 3 as instance 306 of communication session 104.

Wireless IF 122' is configured to periodically transmit, via wireless unit 122', as follows: the configuration signal at an interval, $I_{CONFIG}$; and the beacon signal at an interval, $I_{BEACON}$, wherein $I_{BEACON} < I_{CONFIG}$. For example, $I_{CONFIG}=15*(I_{BEACON})$, e.g., $I_{CONFIG}=30$ seconds and $I_{BEACON}=2$ seconds. Also, for example, though the beacon signal is transmitted in an unlicensed spectrum, the beacon signal can be of sufficient bandwidth that it does not have to hop, i.e., it can be a non-hopping signal and yet be can be transmitted permissibly in the unlicensed spectrum because it is of sufficient bandwidth. As yet a further example, end node 102 can be configured to wirelessly transmit, at most, only one message therefrom corresponding to a given instance of the beacon signal.

Figure 4A:
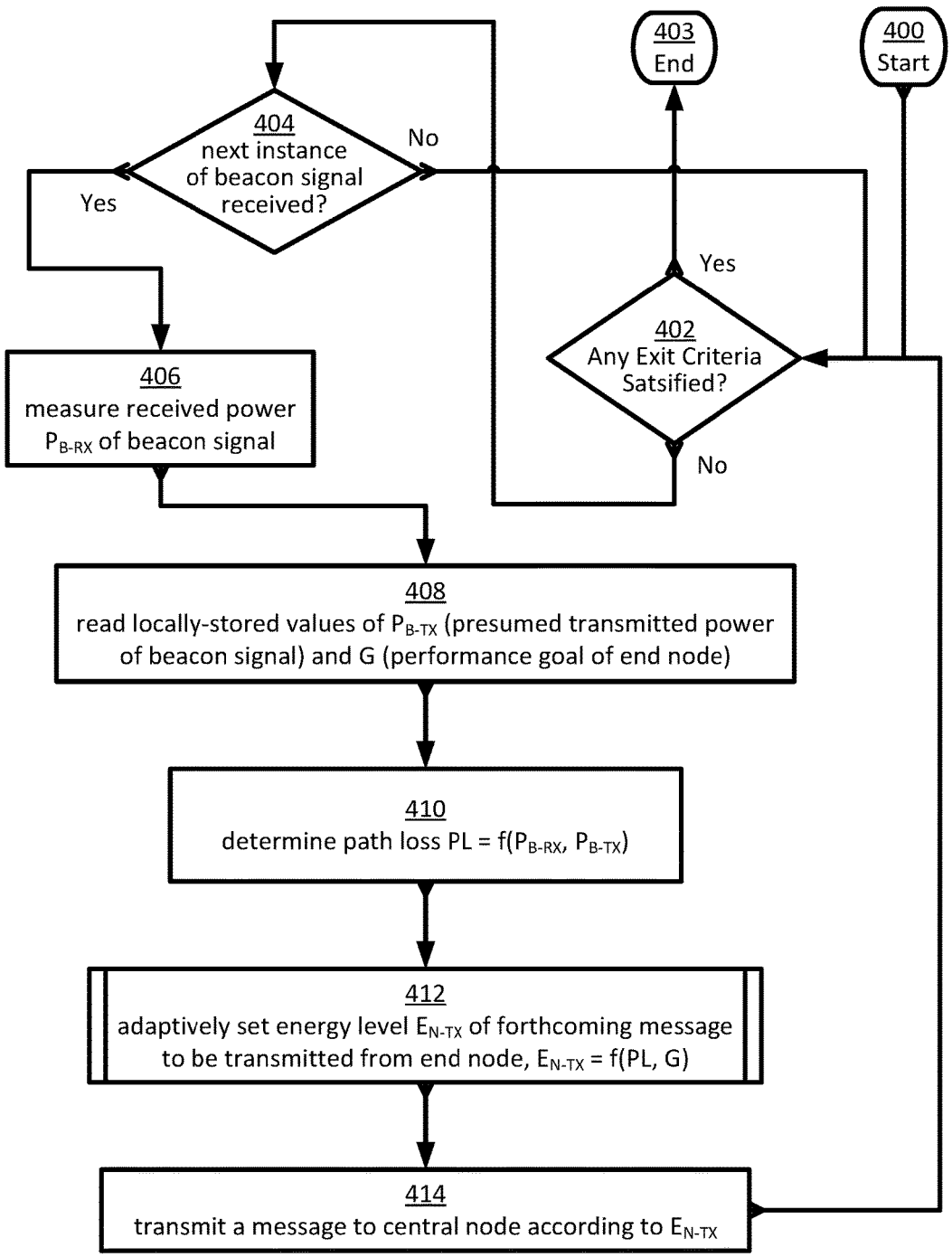
FIGS. 4A-4B are flowcharts illustrating a method of operating an instance of the end node to wirelessly communicate with the central node, according to an embodiment of the present invention, with FIG. 4B illustrating one of the blocks of FIG. 4A in greater detail.
Figure 4B:
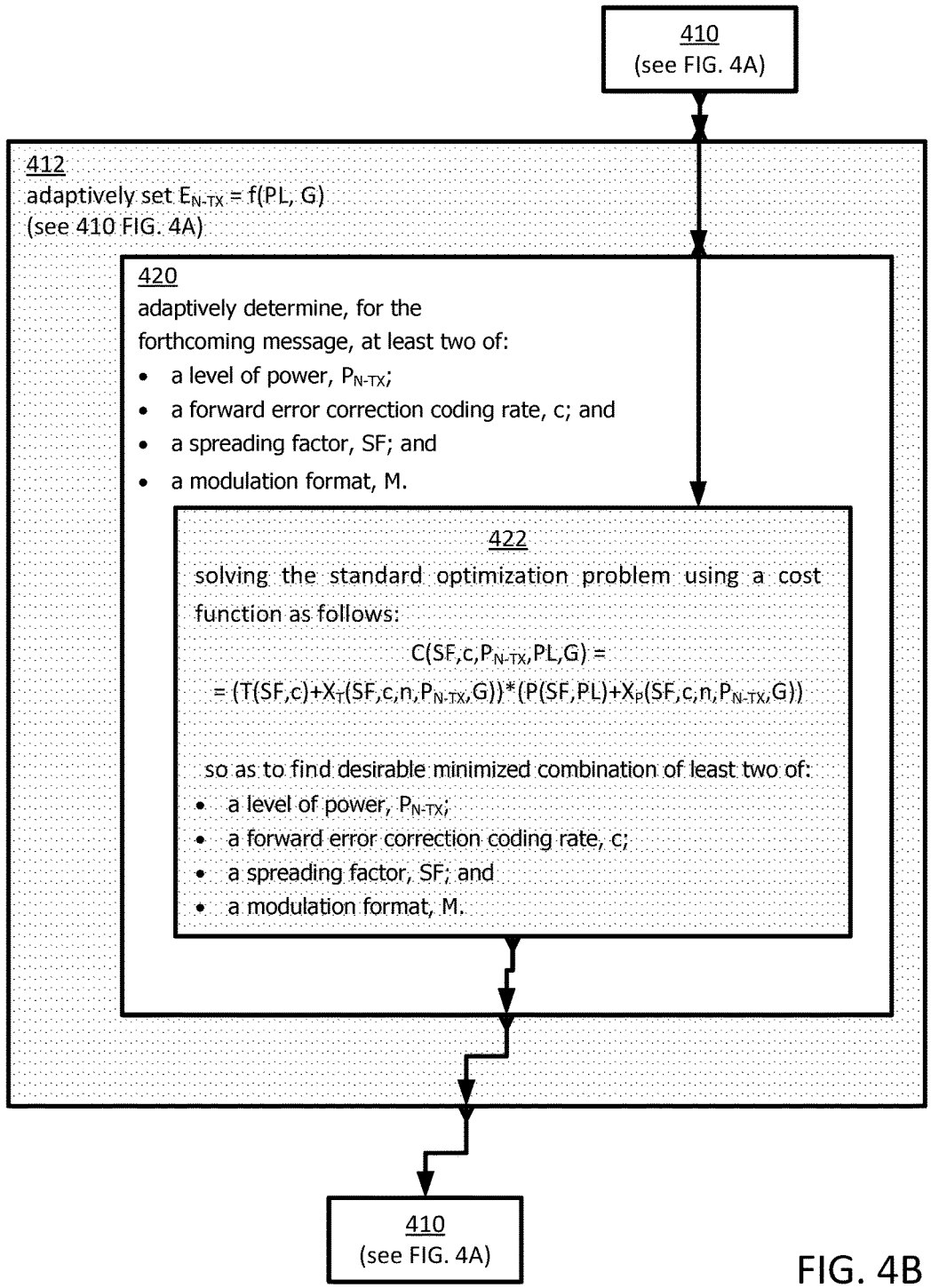

FIGS. 4A-4B are flowcharts illustrating a method of operating an instance of end node 102 to wirelessly communicate with central node 106, according to an embodiment of the present invention, with FIG. 4B illustrating one of the blocks of FIG. 4A in greater detail.

In FIG. 4A, there is a loop. As a general design consideration, no loop should be infinite, i.e., inescapable. Accordingly, flow in FIG. 4A starts at block 400 and proceeds to a decision block 402, where processor 108 decides if any exit criteria have been satisfied. If the outcome of decision block 402 is yes (one or more of the exit criteria are satisfied), then flow proceeds to block 403 and ends. If the outcome of decision block 402 is no (none of the exit criteria has been satisfied), then flow proceeds to a decision block 404.

At decision block 404, wireless IF 114'' determines if a next instance 302 of the beacon signal has been received via wireless unit 114'. If the outcome of decision block 404 is no (the next instance of the beacon signal has NOT been received), then wireless IF 114'' waits, e.g., then flow loops back to the input of decision block 402. If the outcome of decision block 404 is yes (the next instance of the beacon signal HAS been received), then flow proceeds to a block 406, where received-power sensor 130 measures a received power $P_{B-RX}$ of beacon signal. For example, the figure of merit EIRP (Effective Isotropic Radiated Power) can be used as $P_{B-RX}$. From block 406, flow proceeds to a block 408, where values stored in memory 110 are read. More particularly, from memory 110, a value of $P_{B-TX}$ (representing a presumed transmitted power of the beacon signal) is read by path-loss unit 132, and a value of G (representing a performance goal of end node 102) is read by transmit-energy unit 134. Alternatively, the value of G otherwise read at block 408 could be read after a block 410 (discussed below) and before block 412 (discussed below). From block 408, flow proceeds to a block 410.

At block 410, path-loss unit 132 determines a path loss PL based on the received power $P_{B-RX}$ and the presumed transmitted power $P_{B-TX}$ of the beacon signal, i.e., $PL=f\{P_{B-RX}, P_{B-TX}\}$. For example, $PL=P_{B-RX}-P_{B-TX}$. From block 410, flow proceeds to a block 412, where transmit-energy unit 132 adaptively sets an energy level $E_{N-TX}$ of a forthcoming message, to be transmitted via wireless IF 114'' and wireless unit 114', based on PL and G.

Typically, an instance of end node 102 will be powered by a battery (not illustrated), e.g., a battery of small capacity such as a coin-type battery. As such, one factor in operating a given instance of end node 102 is the effect of a given energy level $E_{N-TX}$ of a forthcoming message on the life of its battery.

Not all instances of end node 102 will be located the same distance from central node 106 nor experience the same path loss therebetween. As such, there are additional factors in operating a given instance of end node 102 that relate to path distance and path loss. More particularly, a factor in operating a given instance of end node 102 is the effect of a given energy level $E_{N-TX}$ of a forthcoming message on the transmission power and whether the power is sufficient to achieve a minimum desired probability that the forthcoming message will reach (be received by) central node 102.

Another factor in operating a given instance of end node 102 is the effect of a given energy level $E_{N-TX}$ of a forthcoming message in terms of the size of its spreading factor (or, in other words, the duration of its transmission time) and whether the forthcoming message that is assumed to be received by central node 102 will achieve suffer no more than a maximum acceptable degree of noise corruption (and so be understandable by central node 106). The transmission time is directly proportional to the spreading factor, and the noise corruption level in a received signal is inversely proportional to the spreading factor, the transmission time and the transmission power, respectively.

Accordingly, such factors and others can be taken into consideration by transmit-energy unit 132 in block 412. Block 412 is discussed in more detail below in the context of FIG. 4B. For each instance of the beacon signal (and thus for each instance of the frame as there is one frame per beacon signal), for example, transmit-energy unit 134 can determine one corresponding instance of the energy level $E_{N-TX}$ once; furthermore, transmit-energy unit 134 can send one or messages during a given frame, with each message during the frame being sent using the same the energy level $E_{N-TX}$. From block 412, flow proceeds from block 412 to a block 414.

At block 414, transmit-energy unit 134 sends, via wireless IF 114" and wireless unit 114', a message to central node 106 according to the energy level $E_{N-TX}$. From block 414, flow proceeds to loop back to decision block 402. An example of an exit criterion that could be determined in block 402 as being satisfied is a determination that flow has proceed to decision block 402 from block 414.

As noted above, FIG. 4B is a flowchart illustrating block 412 of FIG. 4A in more detail.

In FIG. 4B, block 412 (the adaptive setting of an energy level $E_{N-TX}$ of a forthcoming message) is illustrated as including a block 420, in which transmit-energy unit 132 (and more particularly, standard optimizer 310) adaptively determines, for the forthcoming message, at least two of: a level of power, $P_{N-TX}$; a forward error correction coding rate, c; a spreading factor, SF, and a modulation rate, M. For example, M can be the LoRa™ modulation format, frequency shift keying ("FSK"), etc.

Changing each of $P_{N-TX}$, c, SF and M causes, as a consequence, the energy level $E_{N-TX}$ to change, and thus causes the energy consumed by the transmission to change. And changing two or more of $P_{N-TX}$, c, SF and M consequentially causes the energy level $E_{N-TX}$ to change. Hence, the energy level $E_{N-TX}$ is adaptively set by adaptively setting one or more of $P_{N-TX}$, c, SF and M, which results in adaptive transmission energy consumption.

Block 420 itself is illustrated as including a block 422, in which transmit-energy unit 132 (and more particularly, standard optimizer 310) solves a standard optimization problem. In general, a standard optimization problem is that of finding a best solution from all feasible solutions. Standard optimizer 310 is configured to use PL and G as inputs for finding a desirable minimized combination of the least two of $P_{N-TX}$, c, SF and M. Flow proceeds within block 412 to block 420, and then within block 420 to block 422. Likewise, flow proceeds outward from block 422 to block 420, and then outward from block 420 to block 412.

In other words, the outputs of blocks 420 and 422, respectively, can be one of several instances of a definition $DEF_{E_{N-TX}}$ of $E_{N-TX}$. Such instances of definition $DEF_{E_{N-TX}}$ include: a definition $DEF_{E_{N-TX}} \supset \{P_{N-TX}, c\}$; a definition $DEF_{E_{N-TX}} \supset \{P_{N-TX}, SF\}$; a definition $DEF_{E_{N-TX}} \supset \{P_{N-TX}, M\}$; a definition $DEF_{E_{N-TX}} \supset \{c, SF\}$; a definition $DEF_{E_{N-TX}} \supset \{c, M\}$; a definition $DEF_{E_{N-TX}} \supset \{SF, M\}$; a definition $DEF_{E_{N-TX}} \{P_{N-TX}, c, SF\}$; a definition $DEF_{E_{N-TX}} \supset \{P_{N-TX}, C, M\}$; a definition $DEF_{E_{N-TX}} \supset \{P_{N-TX}, SF, M\}$; a definition $DEF_{E_{N-TX}} \supset \{c, SF, M\}$; and a definition $DEF_{E_{N-TX}} \supset \{P_{N-TX}, C, SF, M\}$;

Values of the performance goal G include: values that maximize data-reliability of the data as received at the central node; values that optimize the energy level $E_{N-TX}$ relative to battery-chemistry-specific attributes of the battery sourcing the end node; e.g., relative to the battery-chemistry and physics of a coin cell battery; values that reflect a desired ratio of data-reliability versus battery management; and values that maximize network capacity (or, in other words, minimize time on air).

For example, transmit-energy unit 132 can be configured to solve the standard optimization problem using a cost function as follows:

$$C(SF, c, P_{N-TX}, PL, G) = (T(SF, c) + X_T(SF, c, n, P_{N-TX}, G)) * (P(SF, PL) + X_P(SF, c, n, P_{N-TX}, G))$$

wherein:

$P_{N-TX}$ is a target value of EIRP (Effective Isotropic Radiated Power) and is assumed to be a constant;

T(SF, c) is a time on air required to transmit the forthcoming message;

c is the forward error correction coding rate;

n denotes time dependence (discussed in more detail below); and

P(SF, PL) is a power consumed by the end node; and $X_T(SF, c, n, P_{N-TX}, G)$ and $X_P(SF, c, n, P_{N-TX}, G)$ are a time-on-air weighting function and a total-transmission-power weighting function based SF, c, n, $P_{N-TX}$ and G, respectively; and wherein:

the evaluation of the cost function at PL and G is represented as follows:

$$\{SF, c, P_{N-TX}\}_{opt} = \operatorname*{argmin}_{SF, c, P_{N-TX}} C(SF, c, P_{N-TX}, PL, G) \Big|_{G, PL}.$$

The weighting functions $X_T(SF, G)$ and $X_P(SF, G)$ can be determined empirically and/or heuristically. The weighting functions $X_T(SF, G)$ and $X_P(SF, G)$ can be read from memory 110 by standard optimizer 310.

For example, the time dependence, n, can be the number of re-transmissions of the same message. With each re-transmission, e.g., one of more of the factors SF, c, n, $P_{N-TX}$ and G can be increased, respectively. Alternatively, e.g., there can be a maximum number of re-transmissions permitted such that the factors SF, c, n, $P_{N-TX}$ and G can be maximized, respectively, with the last permitted re-transmission.

As a further example, transmit-energy unit 132 can be configured to relate the $X_T$(SF, c, $P_{N-TX}$, G) and the $X_P$(SF, c, $P_{N-TX}$, G) weighting functions as follows:

to maximize a life of a battery sourcing the end node, then set $X_T=0$ and $X_P=0$;

to minimize time on air, then set $X_T>0$ and $X_P=0$; and to minimize peak current draw from the battery, then set $X_T=0$ and $X_P>0$; and otherwise set $X_T>0$ and $X_P>0$.

Figure 5:
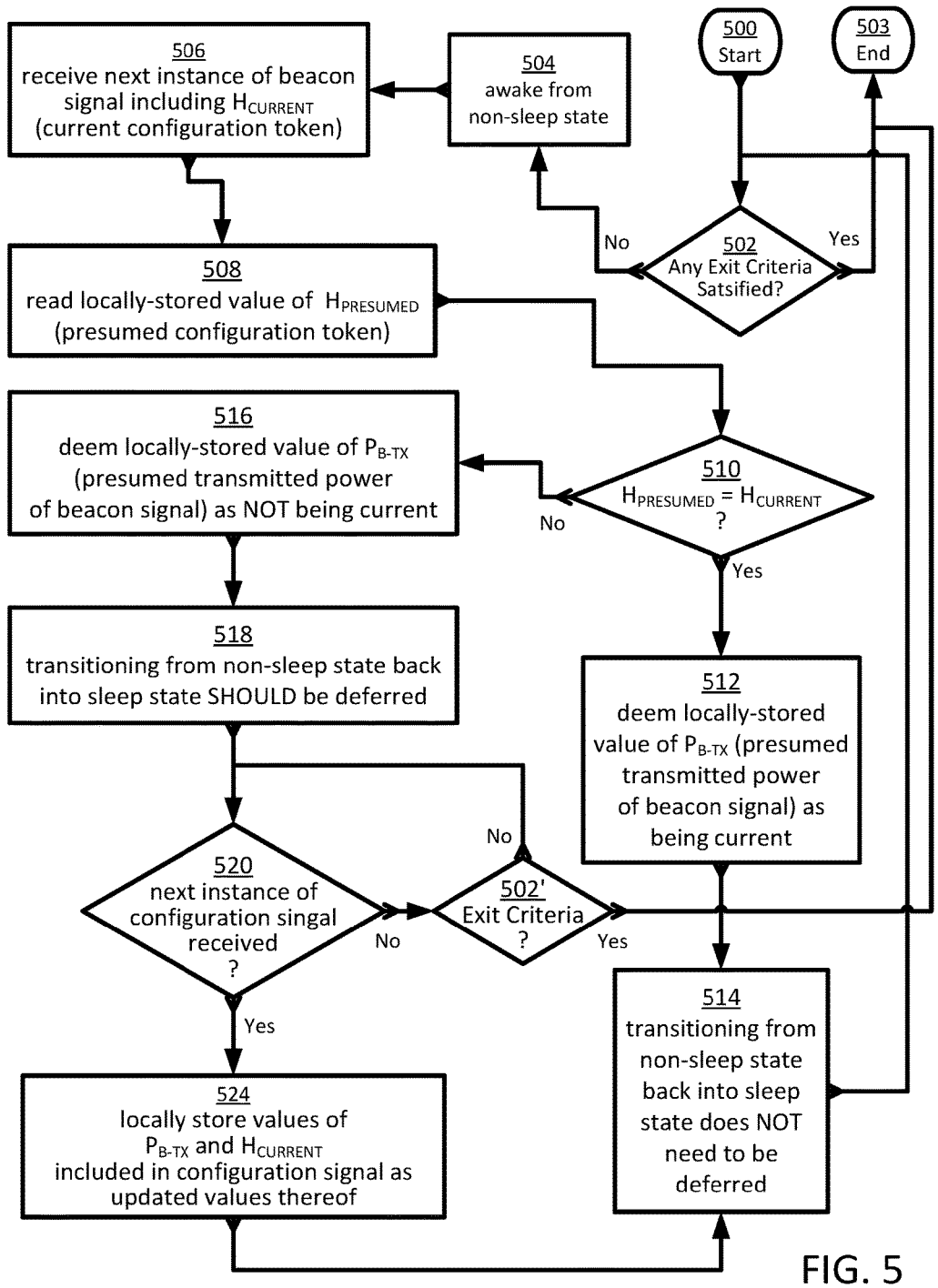
FIG. 5 is a flowchart illustrating another method of operating an instance of the end node to wirelessly communicate with the central node, according to an embodiment of the present invention.

FIG. 5 is a flowchart illustrating another method of operating an instance of end node 102 to wirelessly communicate with central node 106, according to an embodiment of the present invention.

In FIG. 5, there is a loop. As a general design consideration, no loop should be infinite, i.e., inescapable. Accordingly, flow in FIG. 5 starts at block 500 and proceeds to a decision block 502, where processor 108 decides if any exit criteria have been satisfied. If the outcome of decision block 502 is yes (one or more of the exit criteria are satisfied), then flow proceeds to block 503 and ends. If the outcome of decision block 502 is no (none of the exit criteria has been satisfied), then flow proceeds to a block 504. At block 504, the instance of end node 102 awakes from a sleeping state. It is noted that instances of end node 102 each have operational states including: a non-sleep state; and a sleep state exhibiting reduced-power-consumption relative to the non-sleep state. The sleep state and/or the non-sleep state may itself/themselves be a set of states, respectively. From block 504, flow proceeds to a block 506.

At block 506, wireless IF 114" determines that a next instance 302 of the beacon signal has been received via wireless unit 114'. Each instance B of the beacon signal includes an instance H of a corresponding configuration token. Hence, upon receipt of the next instance B(i) of the beacon signal, wireless IF 114" thereby obtains the next (and then current) instance H(i) of the configuration token, and provides the same to transmit-energy unit 134.

The configuration token H is similar in some respects to a session token, as the latter is generally understood in computer science. A session token can be a unique identifier, e.g., in the form of a hash generated by a hash function, that is used to identify the current instance of a session. Here, the configuration token can be generated by configuration-signal generator 128 (as discussed below), e.g., in the form of a hash resulting from a hash function used by configuration-signal generator 128.

From block 506, flow proceeds to a block 508, where transmit-energy unit 134 reads a value $H_{PRESUMED}$ (representing a presumed configuration token) from memory 110. From block 508, flow proceeds to a decision block 510.

At decision block 510, transmit-energy unit 134 determines if the presumed configuration token $H_{PRESUMED}$ equals the current instance H(i) of the configuration token, if $H_{PRESUMED}$=H(i). If the outcome of decision block 510 is yes ($H_{PRESUMED}$=H(i)), then flow proceeds to a block 512, where transmit-energy unit 134 deems the status of $P_{B-TX}$ ((again, representing a presumed transmitted power of the beacon signal that is stored in memory 110) as being current. From block 512, flow proceeds to a block 514, where transmit-energy unit 134 determines that transitioning from the non-sleep state back into the sleep state does NOT need to be deferred due to a non-current status of the presumed configuration token $H_{PRESUMED}$. Of course, there may be other reasons (not addressed herein) that warrant deferring the transition from the non-sleep state back into the sleep state. From block 514, flow proceeds to loop back to decision block 502. An example of an exit criterion that could be determined in block 502 as being satisfied is a determination that flow has proceed to decision block 502 from block 514.

If the outcome of decision block 510 is no ($H_{PRESUMED}\ne H(i)$), then flow proceeds to a block 516, where transmit-energy unit 134 deems the status of the $P_{B-TX}$ (again, representing a presumed transmitted power of the beacon signal that is stored in memory 110) as NOT being current. From block 516, flow proceeds to a block 518, where transmit-energy unit 134 determines that transitioning from the non-sleep state back into the sleep state SHOULD be deferred due to the non-current status of the presumed configuration token $H_{PRESUMED}$. Of course, there may be additional reasons (not addressed herein) that warrant deferring the transition from the non-sleep state back into the sleep state. From block 518, flow proceeds to a decision block 520, with flow-control thereby being transferred from transmit-energy unit 134 to wireless IF 114".

At decision block 520, wireless IF 114" determines if a next instance 304 of the configuration signal has been received via wireless unit 114'. If the outcome of decision block 520 is no (the next instance of the configuration signal has NOT been received), then wireless IF 114" waits, e.g., then flow loops back to a decision block 502', where processor 116 decides if any exit criteria have been satisfied. If the outcome of decision block 502' is yes (one or more of the exit criteria are satisfied), then flow proceeds to block 503 and ends. If the outcome of decision block 502' is no (none of the exit criteria has been satisfied), then flow proceeds back to the input of decision block 520. If the outcome of decision block 520 is yes (the next instance of the configuration signal HAS been received), then flow proceeds to a block 524.

Each instance of the configuration signal includes an instance of $P_{B-TX}$ (again, representing transmitted power of the beacon signal as measured by transmitted-power sensor 126 of central node 106) and an instance H of a corresponding configuration token. Hence, upon receipt of the next instance of the configuration token, wireless IF 114" thereby obtains the next (and then current) instance of $P_{B-TX}$ and the next (and then current) instance H(i) of the configuration token.

At block 524, wireless IF 114" stores the next (and then current) instance of $P_{B-TX}$ and the next (and then current) instance H(i) of the configuration token in memory 110 as the presumed transmitted power $P_{B-TX}$ and the presumed configuration token $H_{PRESUMED}$, respectively. From block 524, flow proceeds to block 514 (discussed above).

Figure 6:
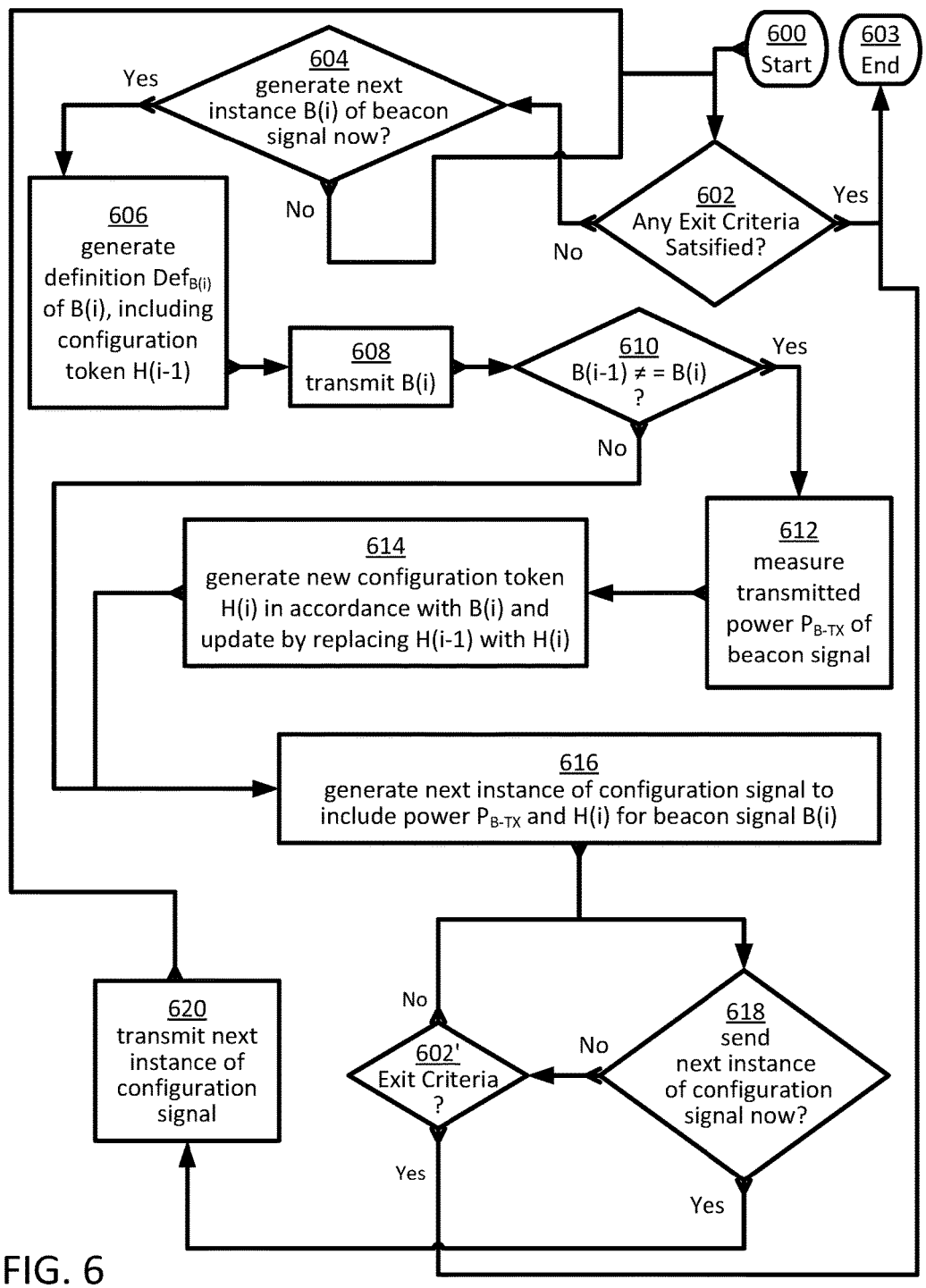
FIG. 6 is a flowchart illustrating a method of operating the central node to wirelessly communicate with instances of the end node, according to an embodiment of the present invention.

FIG. 6 is a flowchart illustrating a method of operating central node 106 to wirelessly communicate with instances of end node 102, according to an embodiment of the present invention.

In FIG. 6, there is a loop. As a general design consideration, no loop should be infinite, i.e., inescapable. Accordingly, flow in FIG. 6 starts at block 600 and proceeds to a decision block 602, where processor 116 decides if any exit criteria have been satisfied. If the outcome of decision block 602 is yes (one or more of the exit criteria are satisfied), then flow proceeds to block 503 and ends. If the outcome of decision block 602 is no (none of the exit criteria has been satisfied), then flow proceeds to a decision block 604.

At block 604, beacon-signal generator 124 determines if enough time has elapsed as a condition of generating the next instance B(i) of the beacon signal. It is to be recalled that central node 106, and more particularly beacon-signal generator 124, is configured to periodically transmit (via wireless IF 122" and wireless unit 122') the beacon signal B at an interval, $I_{BEACON}$. If the outcome of decision block 604 is no (enough time has NOT elapsed), then beacon-signal generator 124 waits, e.g., then flow loops back to the input of decision block 402. If the outcome of decision block 604 is yes (enough time HAS elapsed), then flow proceeds to a block 606.

At block 606, beacon-signal generator 124 generates a next definition $Def_{B(i)I}$ of the next beacon signal B(i) that includes a previous value H(i−1) of the configuration token, $Def_{B(i)I} \supset H(i-1)$. From block 606, flow proceeds to a block 608, where beacon-signal generator 124 (via wireless IF 114" and wireless unit 114') sends beacon signal B(i) to the instances of end node 102. From block 608, flow proceeds to a decision block 610.

At decision block 610, transmitted-power sensor 126 determines if the $i^{th}$ and $(i-1)^{th}$ instances of the beacon signal B differ such that B(i−1)≠B(i). If the outcome of decision block 610 is no (B(i−1)=B(i)), then flow proceeds to a block 616 (discussed below). If the outcome of decision block 610 is yes (B(i−1)≠B(i)), then flow proceeds to a block 612, where transmitted-power sensor 126 measures a transmitted power, $P_{B-TX}$, of B(i). For example, the figure of merit EIRP (Effective Isotropic Radiated Power) can be used as $P_{B-TX}$. From block 612, flow proceeds to a block 614, where configuration-signal generator 128 is configured to generate a new configuration token H(i) in accordance with B(i) and updates memory 110 by replacing H(i−1) with H(i). From block 614, flow proceeds to a block 616 (discussed below).

At block 616, configuration-signal generator 128 generates a new configuration signal that includes H(i) and a value representing a transmitted power, $P_{B-TX}$, of B(i), $Def_{config-signal} \supset H(i), P_{B-TX}$. From block 616, flow proceeds to a decision block 618, where configuration-signal generator 128 determines if enough time has elapsed as a condition of sending the next instance of the configuration signal. It is to be recalled that central node 106, and more particularly configuration-signal generator 128, is configured to periodically transmit the configuration signal at an interval, $I_{CONFIG}$. If the outcome of decision block 604 is no (enough time has NOT elapsed), then configuration-signal generator 128 waits, e.g., then flow proceeds to a decision block 602', where processor 116 decides if any exit criteria have been satisfied. If the outcome of decision block 602' is yes (one or more of the exit criteria are satisfied), then flow proceeds to block 603 and ends. If the outcome of decision block 602' is no (none of the exit criteria has been satisfied), then flow proceeds back to the input of decision block 618.

If the outcome of decision block 618 is yes (enough time HAS elapsed), then flow proceeds to a block 620. At block 620, configuration-signal generator 128 (via wireless IF 114" and wireless unit 114') sends the next instance of the configuration signal. From block 620, flow loops back to decision block 602 (discussed above).

As noted, the value of G (representing a performance goal of end node 102) and the weighting functions $X_T(SF, G)$ and $X_P(SF, G)$ can be read from memory 110, respectively. As part of an initial configuration of an instance of end node 102, the value of G and the weighting functions $X_T(SF, G)$ and $X_P(SF, G)$ can be stored in memory 110. Optionally, the value of G, the weighting function $X_T(SF, G)$ and the weighting function $X_P(SF, G)$ can be updated, e.g., an additional pieces of information included in an instance of a configuration signal 304, respectively. For example, in cooperation with processor 108), wireless IF 114" can extract an updated value of G, the updated weighting function $X_T(SF, G)$ and/or the updated weighting function $X_P(SF, G)$ from an instance of configuration signal 304, and then store the respective updates, e.g., by overwriting their corresponding predecessors, respectively.

The present invention is not limited to the particular embodiments illustrated in the drawings and described above in detail. Those skilled in the art will recognize that other arrangements could be devised. The present invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present invention has been described with reference to specific illustrative embodiments, modifications and variations of the present invention may be constructed without departing from the spirit and scope of the present invention as set forth in the following claims.

While the present invention has been described in the context of the embodiments explicitly discussed herein, those skilled in the art will appreciate that the present invention is capable of being implemented and distributed in the form of a computer-usable medium (in a variety of forms) containing computer-executable instructions, and that the present invention applies equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the invention. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:
1. A method of operating an end node to wirelessly communicate with a central node, the method comprising:
    receiving wirelessly a beacon signal periodically transmitted from the central node;
    measuring a received power, $P_{B-RX}$, of the beacon signal;

reading values of $P_{B\text{-}TX}$ and G stored at the end node and representing a presumed transmitted power of the beacon signal and a performance goal of the end node, respectively;

determining a path loss, PL, of the beacon signal based on a difference between the $P_{B\text{-}RX}$ and the stored $P_{B\text{-}TX}$; and in response to the determining, adaptively setting an energy level, $E_{N\text{-}TX}$, of a forthcoming message to be transmitted from the end node by adaptively determining, based on only the PL and the G, at least two of:

a level of power, $P_{N\text{-}TX}$;
a forward error correction coding rate, c;
a spreading factor, SF; and
a modulation format, M.

2. The method of claim 1, wherein the adaptively determining includes:

solving a standard optimization problem using the PL and the G as inputs to find a desirable minimized combination of the at least two of:
the level of power, $P_{N\text{-}TX}$;
the forward error correction coding rate, c; and
the spreading factor, SF; and
the modulation format, M.

3. The method of claim 2, wherein the solving the standard optimization problem uses a cost function as follows:

$$C(SF,c,P_{N\text{-}TX},PL,G)=(T(SF,c)+XT(SF,c,n,P_{N\text{-}TX},G))*(P(SF,PL)+Xp(SF,c,n,P_{N\text{-}TX},G))$$

wherein:
SF is the spreading factor;
c is the forward error correction coding rate;
n denotes time dependence;
$P_{N\text{-}TX}$ is a target value of EIRP (Effective Isotropic Radiated Power) and is assumed to be a constant;
PL is the path loss;
G is the performance goal;
T(SF, c) is a time on air required to transmit the forthcoming message; and
P(SF, PL) is a power consumed by the end node; and
XT and XP are a time-on-air weighting function and a total-transmission power weighting function based on SF, c, n, $P_{N\text{-}TX}$, and G, respectively; and such that evaluation of the cost function at the PL and the G is represented as follows:

$$\{SF, c, P_{N-TX}\}_{opt} = \underset{SF,c,P_{N-TX}}{\operatorname{argmin}} \left. C(SF, c, P_{N-TX}, PL, G) \right|_{G,PL}.$$

4. The method of claim 3, wherein the XT and the XP weighting functions relate as follows:
to maximize a life of a battery sourcing the end node, then XT=0 and XP=0;
to minimize time on air, then XT>0 and XP=0; and
to minimize peak current draw from the battery, then XT=0 and XP>0; and
otherwise XT>0 and XP>0.

5. The method of claim 1, wherein values of the performance goal G include:
values that maximize data-reliability of the data as received at the central node;

values that optimize the energy level $E_{N\text{-}TX}$ relative to battery-chemistry-specific attributes of the battery sourcing the end node; and
values that reflect a desired ratio of data-reliability versus battery management.

6. The method of claim 1, wherein:
the presumed transmitted power, $P_{B\text{-}TX}$, of the beacon signal changes over time; and the method further comprises:
receiving instances of a configuration signal periodically-transmitted from the central node, each instance including a value representing the presumed transmitted power, $P_{B\text{-}TX}$, of forthcoming instances of the beacon signal; and
storing the received value of $P_{B\text{-}TX}$ locally as the presumed transmitted power of the beacon signal.

7. The method of claim 6, wherein:
the configuration signal is received at an interval, $I_{CONFIG}$; and
the beacon signal is received at an interval, $I_{BEACON}$; and
at least one of the following relations is true:
$I_{BEACON} < I_{CONFIG}$;
$I_{CONFIG} = 15*(I_{BEACON})$; and
$I_{CONFIG} = 30$ seconds and $I_{BEACON} = 2$ seconds.

8. The method of claim 1, wherein:
the end node has operational states including:
a non-sleep state; and
a sleep state exhibiting reduced-power-consumption relative to the non-sleep state;
the end node had transitioned from the sleep state into the non-sleep state before the receiving of a current instance B(i) of the beacon signal;
each instance B of the beacon signal includes an instance H of a corresponding configuration token; and
the method further comprises:
reading a locally-stored value $H_{PRESUMED}$ representing a presumed configuration token;
comparing the presumed configuration token against a current instance H(i) of the configuration token; and
deeming, if $H_{PRESUMED}=H(i)$, that:
the locally-stored value of $P_{B\text{-}TX}$ is current; and
transitioning from the non-sleep state back into the sleep state does not need to be deferred.

9. The method of claim 8, the method further comprising:
deeming, if $H_{PRESUMED} \neq H(i)$, that:
the locally-stored value of $P_{B\text{-}TX}$ is not current; and
transitioning from the non-sleep state back into the sleep state should be deferred;
receiving instances of a configuration signal periodically-transmitted from the central node;
the configuration signal including:
a value representing a transmitted power, $P_{B\text{-}TX}$, of the beacon signal; and
a corresponding value of the configuration token H(i);
awaiting receipt of a next instance of the configuration signal; and
locally storing the values $P_{B\text{-}TX}$ and H(i) included in the received next instance of the configuration signal as the presumed transmitted power $P_{B\text{-}TX}$ and the presumed configuration token $H_{PRESUMED}$, respectively.

10. The method of claim 1, further comprising:
wirelessly transmitting the forthcoming message to the central node according to the energy level $E_{N\text{-}TX}$.

11. The method of claim 10, wherein:
the wirelessly transmitting is performed in an unlicensed spectrum; and
the beacon signal is a non-hopping signal.

12. An end node configured to wirelessly communicate with a central node, the end node comprising:
a wireless unit configured to receive and transmit messages, respectively;
a wireless interface configured to receive, via the wireless unit, a beacon signal periodically-transmitted from the central node;
a received-power sensor configured to measure a received power, $P_{B-RX}$, of the beacon signal;
a memory storing contents which include:
a value representing a presumed transmitted power, $P_{B-TX}$, of the beacon signal; and
a value, G, representing a performance goal of the end node;
a path-loss unit configured to determine a path loss, PL, of the beacon signal based on a difference between the $P_{B-RX}$ and the stored $P_{B-TX}$; and
a transmit-energy unit configured to, in response to the determination of the PL of the beacon signal, adaptively set an energy level $E_{N-TX}$ of a forthcoming message, to be transmitted via the wireless interface and the wireless unit, by adaptively determining, based on only the PL and the G, at least two of:
a level of power, $P_{N-TX}$;
a forward error correction coding rate, c;
a spreading factor, SF; and
a modulation format, M.

13. The end node of claim 12, wherein the transmit-energy unit is further configured to adaptively determine by:
solving a standard optimization problem using the PL and the G as inputs to find a desirable minimized combination of the at least two of:
the level of power, $P_{N-TX}$;
the forward error correction coding rate, c; and
the spreading factor, SF; and
the modulation format, M.

14. The end node of claim 13, wherein the transmit-energy unit is further configured to solve the standard optimization problem using a cost function as follows:

$$C(SF,c,P_{N-TX},PL,G)=(T(SF,c)+XT(SF,c,n,P_{N-TX},G))*$$
$$(P(SF,PL)+XP(SF,c,n,P_{N-TX},G))$$

wherein:
SF is the spreading factor;
c is the forward error correction coding rate;
n denotes time dependence;
$P_{N-TX}$ is a target value of EIRP (Effective Isotropic Radiated Power) and is assumed to be a constant;
PL is the path loss;
G is the performance goal;
T(SF, c) is a time on air required to transmit the forthcoming message; and
P(SF, PL) is a power consumed by the end node; and
XT and XP are a time-on-air weighting function and a total-transmission power weighting function based on SF, c, n, $P_{N-TX}$, and G, respectively; and
such that evaluation of the cost function at the PL and the G is represented as follows:

$$\{SF, c, P_{N-TX}\}_{opt} = \underset{SF,c,P_{N-TX}}{\mathrm{argmin}} \; C(SF, c, P_{N-TX}, PL, G) \Big|_{G,PL}.$$

15. The end node of claim 14, wherein the transmit-energy unit is further configured to relate the XT and the XP weighting functions as follows:
to maximize a life of a battery sourcing the end node, then set XT=0 and XP=0;
to minimize time on air, then set XT>0 and XP=0; and
to minimize peak current draw from the battery, then set XT=0 and XP>0; and
otherwise set XT>0 and XP>0.

16. The end node of claim 12, wherein values of the performance goal G include:
values that maximize data-reliability of the data as received at the central node;
values that optimize the energy level $E_{N-TX}$ relative to battery-chemistry specific attributes of the battery sourcing the end node; and
values that reflect a desired ratio of data-reliability versus battery management.

17. The end node of claim 12, wherein:
the presumed transmitted power, $P_{B-TX}$, of the beacon signal changes over time; and the wireless interface is further configured to:
receive, via the wireless unit, instances of a configuration signal periodically-transmitted from the central node that includes a value representing the presumed transmitted power, $P_{B-TX}$, of forthcoming instances of the beacon signal; and
store, in the memory, the received value of $P_{B-TX}$ as the presumed transmitted power of the beacon signal.

18. The end node of claim 17, wherein:
the configuration signal is received at an interval, $I_{CONFIG}$; and
the beacon signal is received at an interval, $I_{BEACON}$; and
at least one of the following relations is true:
$I_{BEACON}<I_{CONFIG}$;
$I_{CONFIG}=15*(I_{BEACON})$; and
$I_{CONFIG}=30$ seconds and $I_{BEACON}=2$ seconds.

19. The end node of claim 12, wherein:
the end node has operational states including:
a non-sleep state; and
a sleep state exhibiting reduced-power-consumption relative to the non-sleep state;
the end node had transitioned from the sleep state into the non-sleep state before receipt of a current instance B(i) of the beacon signal;
each instance B of the beacon signal includes an instance H of a corresponding configuration token; and
the transmit-energy unit is further configured to:
read a locally-stored value $H_{PRESUMED}$ representing a presumed configuration token;
compare the presumed configuration token against a current instance H(i) of the configuration token; and
deem, if $H_{PRESUMED}=H(i)$, that:
the locally-stored value of $P_{B-TX}$ is current; and
transitioning from the non-sleep state back into the sleep state does not need to be deferred.

20. The end node of claim 19, wherein:
the transmit-energy unit is further configured to deem, if $H_{PRESUMED} \neq H(i)$,
the locally-stored value of $P_{B-TX}$ is not current; and
transitioning from the non-sleep state back into the sleep state should be deferred;
the wireless interface is configured to receive, via the wireless unit, instances of a configuration signal periodically-transmitted from the central node;

the configuration signal including:
  a value representing a transmitted power, $P_{B-TX}$, of the beacon signal; and
  a corresponding value of the configuration token H(i); and
the transmit-energy unit is further configured to:
  await receipt of a next instance of the configuration signal by the wireless interface; and
  store, in the memory, the values $P_{B-TX}$ and H(i) included in the received next instance of the configuration signal as the presumed transmitted power $P_{B-TX}$ and the presumed configuration token $H_{PRESUMED}$, respectively.

21. The end node of claim 12, wherein the transmit-energy unit is further configured to:
send, via the wireless interface and the wireless unit, the forthcoming message to the central node according to the energy level $E_{N-TX}$.

22. The end node of claim 21, wherein:
the transmit-energy unit is further configured to:
  send, via the wireless interface and the wireless unit, in an unlicensed spectrum; and
the beacon signal is a non-hopping signal.

23. A method of operating a central node to wirelessly communicate with instances of an end node, the method comprising:
periodically generating a beacon signal having a transmit power;
  wherein the transmit power of the beacon signal changes over time;
periodically transmitting, to the instances of the end node, the beacon signal;
determining, if $i^{th}$ and $(i-1)^{th}$ instances of the beacon signal differ, based on one or more of a level of power, $P_{N-TX}$, a forward error correction coding rate, c, a spreading factor, SF, and a modulation format, M;
measuring, if B(i–1)≠B(i), a transmitted power, $P_{B-TX}$, of the i th beacon signal B(i);
periodically generating a configuration signal that includes:
  a value representing the transmitted power, $P_{B-TX}$, of B(i); and
in response to the measuring, periodically transmitting, to the instances of the end node, the configuration signal, wherein the measuring is performed only in response to the B(i–1)≠the B(i).

24. The method of claim 23, wherein:
the configuration signal is transmitted at an interval, $I_{CONFIG}$; and
the beacon signal is transmitted at an interval, $I_{BEACON}$; and
at least one of the following relations is true:
$I_{BEACON} < I_{CONFIG}$;
$I_{CONFIG} = 15 * (I_{BEACON})$; and
$I_{CONFIG} = 30$ seconds and $I_{BEACON} = 2$ seconds.

25. The method of claim 23, wherein:
B(i) includes H(i–1); and
if B(i–1)≠B(i), then:
  H(i–1) is outdated; and
  the generating of the configuration signal includes:
    generating a configuration token H(i) in accordance with B(i); and
    including, in the configuration signal, the configuration token H(i);
  the generating of the beacon signal includes:
    including, in an instance B(i+1) of the beacon signal, the configuration token H(i) corresponding to B(i).

26. A central node configured to wirelessly communicate with instances of an end node, the central node comprising:
a wireless unit configured to receive and transmit messages, respectively;
a wireless interface configured to transmit, via the wireless unit, a beacon signal and a configuration signal, respectively;
a beacon-signal generator configured to:
  periodically generate a beacon signal B having a transmit power; and
  periodically send, to the instances of the end node and via the wireless interface and the wireless unit, the beacon signal B;
  wherein the transmit power of the beacon signal changes over time;
a transmitted-power sensor configured to:
  determine if $i^{th}$ and $(i-1)^{th}$ instances of the beacon signal B differ such that B(i–1)≠B(i), based on one or more of a level of power, $P_{N-TX}$, a forward error correction coding rate, c, a spreading factor, SF, and a modulation format, M; and
  measure, if B(i–1)≠B(i), a transmitted power, $P_{B-TX}$, of B(i);
a configuration-signal generator configured to:
  periodically generate a configuration signal that includes a value representing the transmitted power, $P_{B-TX}$, of B(i); and
  in response to the measurement of $P_{B-TX}$, periodically send, to the instances of the end node and via the wireless interface and the wireless unit, the configuration signal,
    wherein the measurement is performed only in response to the B(i–1)≠the B(i).

27. The central node of claim 26, wherein:
the wireless interface is further configured to:
  periodically transmit the configuration signal at an interval, $I_{CONFIG}$; and
  periodically transmit the beacon signal at an interval, $I_{BEACON}$; and
at least one of the following relations is true:
$I_{BEACON} < I_{CONFIG}$;
$I_{CONFIG} = 15 * (I_{BEACON})$; and
$I_{CONFIG} = 30$ seconds and $I_{BEACON} = 2$ seconds.

28. The central node of claim 26, wherein:
B(i) includes H(i–1); and
if B(i–1)≠B(i), then:
  H(i–1) is outdated; and
  the configuration-signal generator is further configured to:
    generate a configuration token H(i) in accordance with B(i); and
  the beacon-signal generator is further configured to:
    include, in an instance B(i+1) of the beacon signal, the configuration token H(i) corresponding to B(i).

* * * * *